United States Patent [19]

George

[11] 4,329,177
[45] May 11, 1982

[54] ALKALI METAL SILICATE BINDER COMPOSITIONS

[75] Inventor: Raymond D. George, Milan, Italy

[73] Assignee: Foseco International Limited, Birmingham, England

[21] Appl. No.: 205,957

[22] PCT Filed: Feb. 19, 1980

[86] PCT No.: PCT/GB80/00026

§ 371 Date: Oct. 27, 1980

§ 102(e) Date: Aug. 13, 1980

[87] PCT Pub. No.: WO80/01767

PCT Pub. Date: Sep. 4, 1980

[30] Foreign Application Priority Data

Feb. 27, 1979 [GB] United Kingdom ............... 7906874

[51] Int. Cl.³ ........................ B28B 7/34; C08L 3/02
[52] U.S. Cl. .......................... 106/38.35; 106/38.5 R; 106/80; 106/84; 106/162; 106/213; 106/214
[58] Field of Search .............. 106/38.35, 38.5 R, 80, 106/84, 162, 213, 214

[56] References Cited

U.S. PATENT DOCUMENTS

| | | | |
|---|---|---|---|
| 2,926,098 | 2/1960 | Icenda et al. | 106/38.35 |
| 3,028,340 | 4/1962 | Gandon et al. | 106/38.35 |
| 3,034,909 | 5/1962 | Sams et al. | 106/38.35 |
| 3,255,024 | 7/1966 | Alexander et al. | 106/38.35 |
| 4,070,196 | 1/1978 | Kraak et al. | 106/38.35 |
| 4,194,918 | 3/1980 | George et al. | 106/80 |

FOREIGN PATENT DOCUMENTS

847477 9/1960 United Kingdom .

Primary Examiner—Lorenzo B. Hayes
Attorney, Agent, or Firm—Cushman, Darby & Cushman

[57] ABSTRACT

A binder composition in aqueous solution, suitable for use in the production of foundry sand moulds and cores is obtained by mixing
(i) an alkali metal silicate
(ii) a substantially water soluble carbohydrate selected from monosaccharides, disaccharides, polysaccharides and derivatives thereof and
(iii) urea.

The composition may also contain an oxyanion such as a borate which is capable of forming a water soluble complex with the carbohydrate. The preferred carbohydrate is a stabilized starch hydrolysate whose reducing power has been removed by a process such as hydrogenation.

Moulds and cores bonded using the composition may be hardened by injection of carbon dioxide gas, or a chemical hardening agent for the alkali metal silicate may be added to the sand.

18 Claims, No Drawings

ALKALI METAL SILICATE BINDER COMPOSITIONS

This invention relates to alkali metal silicate binder compositions, particularly for use in the production of foundry moulds and cores.

It is common practice to use alkali metal silicate aqueous solutions, particularly sodium silicate solutions, as binders for sand for the production of foundry moulds and cores. These solutions usually contain 40-50% by weight of a sodium silicate having a $SiO_2:Na_2O$ ratio of from 2.0:1 to 3.0:1. In one process the sodium silicate solution is mixed with sand, and the resultant mixture is formed into a mould or core. Carbon dioxide gas is then blown through the mould or core, and due to chemical reaction between the sodium silicate and the carbon dioxide a bonded mould or core results. In another process a so-called hardener, which may be for example, a mixture of diacetin and triacetin, is mixed with sodium silicate and sand, and the mixture is formed into a mould or core, which on standing hardens due to chemical reaction between the hardener and the sodium silicate.

A disadvantage of both processes is that after casting the moulds and cores are difficult to break down and remove from the solidified cast metal. This can be particularly disadvantageous in the case of cores of complex shape, or when the moulds and cores are used for the production of castings in metals which are cast at high temperatures, e.g. steel castings. Accordingly numerous proposals have been made in the past to add materials, so-called breakdown agents, to the mixture of sand and sodium silicate, which will aid the breakdown or disintegration ability of the sand mould or core after casting.

Among the breakdown agents used is a variety of carbohydrate-containing materials such as cellulose derivatives, starches, and sugars, e.g. sucrose and dextrose.

It has now been found that improved results can be obtained in the production of foundry sand moulds and cores bonded with an alkali metal silicate binder by using a binder composition which contains in addition to the alkali metal silicate and a carbohydrate, urea.

According to the invention there is provided a binder composition in aqueous solution obtained by mixing:
(i) an alkali metal silicate
(ii) a substantially water soluble carbohydrate selected from monosaccharides, disaccharides, polysaccharides and derivatives of any of these and
(iii) urea.

According to a further feature of the invention there is provided a method of making an article of bonded particulate material such as a foundry mould or core, which comprises forming to the desired shape a mixture comprising particulate material and a binder composition in aqueous solution obtained by mixing:
(i) an alkali metal silicate
(ii) a substantially water soluble carbohydrate selected from monosaccharides, disaccharides, polysaccharides and derivatives of any of these and
(iii) urea.

The preferred alkali metal silicate is sodium silicate. The $SiO_2:Na_2O$ ratio of the sodium silicate may vary widely, e.g. from 2.0:1 to 3.5:1 but sodium silicates having a ratio of from 2.0:1 to about 2.5:1 are preferred.

Examples of suitable monosaccharides include glucose, mannose and fructose, and examples of suitable disaccharides include sucrose, maltose and lactose.

Polysaccharides, also known as glycans, are polymers of monosaccharides with or without reducing terminal groups.

The monosaccharide constituent may be an aldose or a ketose. Examples of glycans are glucans (polymers of glucose), xylans (polymers of xylose) and gluco-xylans (copolymers of glucose and xylose).

In general high molecular weight glycans, such as starch, amylose and amylopectin, are unsuitable for use in binder compositions according to the invention since they are not soluble in water. Suitable glycans are available as components of starch hydrolysates or glucose syrups.

Suitable polysaccharide derivatives include glycanitols. Glycanitols are products obtained by the reduction of glycans. The monosaccharide constituent of the glycan may be an aldose or a ketose. During production of a glycanitol the stereo-chemical configuration of the substituted aldose or ketose end group may be retained or there may be conversion in the derived polyhydric alcohol derivative. For example, the reduction of a substituted reducing end group, such as a substituted glucose end group in a starch dextrin, may occur with retention of configuration to yield a substituted glucitol (such as sorbitol) derivative, or with some conversion to a substituted mannitol derivative where the configuration of carbon two is altered. Suitable glycanitols are available as components of hydrogenated starch hydrolysates.

Other suitable derivatives may be produced by the reduction of low molecular weight polysaccharides which have been produced by procedures which cause rupture of the glycosidic linkages in higher molecular weight polysaccharides. Such material are also available as components of hydrogenated starch hydrolysates.

Examples of suitable disaccharide derivatives include hexitols which are produced by the reduction of their corresponding hexoses, for example sorbitol which is produced by the reduction of glucose or gulose and mannitol which is produced by the reduction of mannose, and pentitols which are produced by the reduction of their corresponding pentoses, for example xylitol which is produced by the reduction of xylose.

Commercially available carbohydrate—containing materials which may contain one or more carbohydrates may be used. Example of such materials include molasses from sucrose refining, whey from milk processing, invert sugar or partially inverted sugar which is a mixture of sucrose, fructose and glucose, and the glucose syrups referred to above.

Derivatives of carbohydrates in which the structure is modified other than at the reducing terminal group by processes such as etherification, esterification or oxidation may also be used. Examples of such derivatives are oxidised starch syrups, esters of starch and carboxyalkyl ethers of starch.

The preferred carbohydrates are "stabilised" carbohydrates whose reducing power has been removed in order to render the carbohydrates essentially stable in alkali media.

Stabilised carbohydrates may be produced by hydrogenation or by other processes which remove reducing power such as etherification, esterification or oxidation or by reaction with urea or urea derivatives.

Examples of stabilised carbohydrates are glycanitols, disaccharide derivatives such as maltitol or lactitol, hexitols and pentitols.

The preferred stabilised carbohydrates are the stabilised starch hydrolysates described in British Pat. No. 1,546,079. These stabilised starch hydrolysates may be prepared from starch hydrolysates having a dextrose equivalent of between 5 and 100, preferably between 5 and 75, and more preferably between 10 and 40. Dextrose equivalent is defined as the reducing power i.e. the reducing sugar content of a starch hydrolysate expressed as D-glucose on a dry basis. The starch hydrolysate may be stabilised by selective oxidation, by reaction with urea or urea derivatives, or by hydrogenation. The preferred method is by catalytic hydrogenation with hydrogen and the resulting hydrogenated starch hydrolysate consists of a mixture of glycanitols, reduced low molecular weight polysaccharides, reduced monosaccharides and reduced disaccharides.

The binder composition may also contain an oxyanion salt capable of forming a water soluble complex with the carbohydrate as described in German Patent Application Specification No. 2750294. Examples of suitable oxyanions are oxyanions of boron, tin, germanium, tellurium and arsenic.

The oxyanion may be added to the composition in the form of an oxyanion salt or an oxyanion salt may be formed in situ as a result of interaction between an acid containing the oxyanion or an oxide, and added alkali or alkali contained in the alkali metal silicate.

Examples of suitable oxyanion salts include alkali metal oxyanion salts such as sodium metaborate, sodium tetraborate, sodium pentaborate, sodium germanate, sodium stannate, sodium tellurite and sodium arsenite. Of the oxyanion salts of tin, tellurium and arsenic, stannates, tellurites, and arsenites respectively are preferred. The most preferred oxyanion salts are alkali metal borates since they are readily and economically available.

Examples of oxyanion salts formed in situ are an alkali metal borate formed by interaction between boric oxide and an alkali for example the alkali in the alkali metal silicate, and an alkali metal germanate formed by reaction between germanium dioxide and an alkali.

More than one oxyanion salt may be added to the composition.

The binder may also contain one or more of furfuryl alcohol, formaldehyde or a phenolic compound, selected from monohydric phenols, dihydric phenols, trihydric phenols, phenols of polynuclear hydrocarbons and phenolic acids, which is miscible with or soluble in an aqueous solution of an alkali metal silicate.

Other ingredients may also be present, preferably in relatively minor amounts, for example colourants or additives known in the art for improving the surface finish of metal castings.

The binder composition may be added to the particulate material as separate additions of aqueous alkali metal silicate, aqueous carbohydrate solution and urea or any two or all three of the components may be premixed. Premixing of the urea with the silicate or with the carbohydrate and separate addition of the third component, or premixing of all three components are preferred. However, the method adopted for adding the binder composition is to some extent dependent on the particular carbohydrate material used since some carbohydrate materials, e.g. carbohydrates containing reducing sugars, react with alkali metal silicates and cannot therefore be premixed with the alkali metal silicate and stored. When the carbohydrate and the alkali metal silicate cannot be premixed for storage it may be convenient to dissolve part of the urea in the alkali metal silicate and part in an aqueus solution of the carbohydrate.

When the binder composition also contains an oxyanion salt the oxyanion salt may be added to the particulate material separately from each of the other three components or the oxyanion salt may be premixed with one or more of the other components.

The binder composition will usually contain 15–47% by weight of alkali metal silicate, 2–45% by weight of carbohydrate, 0.1–10% by weight of urea and balance water.

The preferred binder composition contains 26–45% by weight of alkali metal silicate, 3–27% by weight of carbohydrate, 0.5–4% by weight of urea and balance water.

When an oxyanion salt is present the oxyanion salt will usually constitute up to 5% by weight of the binder composition. The preferred oxyanion salt content is from about 0.5 to about 2.0% by weight of the binder composition.

The actual composition for a particular combination of alkali metal silicate, carbohydrate and urea and, when present, oxyanion salt, will depend on a number of factors such as the type of carbohydrate, the degree of mutual solubility of the components, and alkali metal oxide to silica ratio of the alkali metal silicate and the nature of the oxyanion.

The binder composition of the invention may be used to bind a variety of particulate materials but is particularly useful for bonding particulate refractory materials such as silica, olivine, chromite and zircon sands in the manufacture of foundry moulds or cores. After production the mould or core may be hardened by injection of carbon dioxide gas or alternatively a chemical hardening agent for the alkali metal silicate, e.g. a mixture of acetate esters of glycerol, may be added to the sand binder composition mixture before the mould or cores are formed.

The binder compositions of the invention offer a number of advantages when used in the production of foundry moulds or cores due to the presence of urea. When moulds and cores are hardened by gassing with carbon dioxide the gassing time may be reduced to even less than that needed when using the binder compositions described in British patent specification No. 1546079 or German Patent Application specification No. 2750294. Mould or core strength immediately after gassing, and after storage in either dry or humid conditions is also improved, and although increased strength results, breakdown properties, i.e. the ability to break down and remove moulds and cores from solidified cast metal, are not impaired.

As is illustrated in the Examples which follow the binder compositions are particularly suitable for use with chemical hardeners such as esters, and with both carbon dioxide gassed and chemically hardened silicate bonded salts it is possible to use less binder and hence less sodium silicate compared with previously known carbohydrate-containing silicate binder compositions. A reduction in the amount of sodium silicate used not only produces an economic advantage in that it results in a saving of sodium silicate but also gives better breakdown properties of the sand and improved surface finish of metal castings produced using the sand. Furthermore due to a lowering of the amount of residual soda in the sand after casting, the sand is more readily reclaimable for re-use.

The following examples will serve to illustrate the invention.

EXAMPLE 1

Two binder compositions were prepared as follows:

(1) 6.17 parts by weight of anhydrous sodium tetraborate were dissolved in 100 parts by weight of a hydrogenated starch hydrolysate syrup (a mixture of glycanitols, glycanitol derivatives of oligosaccharides, reduced disaccharides and reduced monosaccharides) derived from maize starch and having a starch hydrolysate content of about 65%. The starch hydrolysate syrup had a dextrose equivalent before hydrogenation of about 33 and after hydrogenation of less than 0.2. 20% by weight of the resulting solution was blended with 80% by weight of a solution of sodium silicate having a $SiO_2$:$Na_2O$ ratio of 2.2:1 and a sodium silicate content of about 44%.

(2) 2 parts by weight of urea were dissolved in 100 parts by weight of binder composition (1).

3.5 parts by weight of each of binder compositions (1) and (2) were mixed with 100 parts by weight of silica sand (AFS Fineness No. 44). The sand-binder mixtures were then used to prepare standard AFS 50 mm×50 mm cylindrical cores. Cores were gassed for various times with carbon dioxide gas at 20° C., 0.35 kg/cm$^2$ line pressure and 5.5 l/min flow rate.

The compression strengths of the cores produced were then measured:

(a) on specimens immediately (i.e. within 10 seconds) after gassing.
(b) on specimens stored for 24 hours in a relatively dry laboratory atmosphere.
(c) on specimens stored for 24 hours under humid conditions (25°–26° C., relative humidity 90%).

The results are tabulated below:

| GASSING TIME (secs) | COMPRESSION STRENGTH (kg/cm$^2$) | | | | | |
|---|---|---|---|---|---|---|
| | 5 | 10 | 20 | 30 | 60 | 120 |
| BINDER 1 | | | | | | |
| As gassed | 2.0 | 2.9 | 5.1 | 8.6 | 13.1 | 15.3 |
| Dry storage | 44.2 | 38.1 | 24.2 | 19.6 | 10.6 | 8.7 |
| Humid storage | 13.6 | 12.4 | 11.7 | 8.7 | 8.7 | 7.6 |
| BINDER 2 | | | | | | |
| As gassed | 2.0 | 4.7 | 8.6 | 11.2 | 15.3 | 14.7 |
| Dry storage | 46.1 | 42.9 | 30.3 | 24.7 | 14.6 | 10.6 |
| Humid storage | 16.6 | 13.9 | 13.6 | 12.8 | 10.6 | 10.2 |

Thus binder (2) develops strength on gassing at a faster rate than does binder (1), and binder (2) also gives higher strengths when cores are stored under either dry or humid conditions.

To achieve an as-gassed strength of 6.8 kg/cm$^2$ (i.e. 100 p.s.i.) using binder (1) requires a gassing time of approximately 24 seconds and strengths of approximately 22.4 kg/cm$^2$ after 24 hours dry storage and 10.1 kg/cm$^2$ after 24 hours humid storage are obtained.

In comparison binder (2) requires only 17.5 seconds and results in strengths of 35.7 kg/cm$^2$ after 24 hours dry storage and 13.9 kg/cm$^2$ after 24 hours humid storage.

EXAMPLE 2

Two binder compositions were prepared as follows:

(3) 10 parts by weight of sucrose were dissolved in 90 parts by weight of a solution of sodium silicate having a $SiO_2$:$Na_2O$ ratio of 2.2:1 and a sodium silicate content of approximately 44%.

(4) 2 parts by weight of urea were dissolved in 100 parts by weight of binder composition (3).

Binder compositions (3) and (4) were compared using the procedure described in Example 1.

The results are tabulated below:

| GASSING TIME (secs) | COMPRESSION STRENGTH (kg/cm$^2$) | | | | |
|---|---|---|---|---|---|
| | 10 | 20 | 30 | 60 | 120 |
| BINDER 3 | | | | | |
| As gassed | 2.0 | 3.7 | 7.4 | 13.9 | 14.9 |
| Dry storage | 25.2 | 22.0 | 14.0 | 9.2 | 8.7 |
| Humid storage | 8.5 | 9.2 | 8.3 | 7.6 | 7.6 |
| BINDER 4 | | | | | |
| As gassed | 2.2 | 5.5 | 9.0 | 13.3 | 14.9 |
| Dry storage | 28.2 | 18.7 | 14.4 | 9.7 | 8.7 |
| Humid storage | 7.8 | 7.8 | 7.8 | 7.8 | 7.1 |

This result shows that binder composition (4) improves the rate of strength development on gassing. Thus binder composition (3) requires a time of 28 seconds to achieve an as-gassed strength 6.8 kg/cm$^2$ (i.e. 100 p.s.i.) and results in a strength of 15.0 kg/cm$^2$ after 24 hours dry storage, whereas binder (4) requires only 23 seconds to achieve an as-gassed strength of 6.8 kg/cm$^2$ and results in a slightly higher strength after dry storage of 16.7 kg/cm$^2$.

EXAMPLE 3

0.42 parts by weight of a mixture of hydrolysable esters were mixed with 100 parts by weight of silica sand (AFS Fineness No. 44) followed by 3.5 parts by weight of binder compositions (1) or (2). The resulting sand-binder mixtures were used to prepare standard AFS 50 mm×50 mm cylindrical cores, which were stored in enclosed containers. The compression strengths of the cores were then measured at various time intervals. The compression strengths of cores stored for 24 hours both in enclosed containers and exposed to atmosphere were also measured. The 'bench-life', that is the time during which the mixtures remain workable and conveniently defined as the time required for a standard core to achieve a compression strength of 0.1 kg/cm$^2$, (i.e. 1.5 p.s.i.) was determined for each sand binder mixture.

The results obtained are tabulated below:

| | TEMP. (°C.) | BENCH LIFE (min) | COMPRESSION STRENGTH (kg/cm$^2$) | | | | | | | | 24 HOURS | |
|---|---|---|---|---|---|---|---|---|---|---|---|---|
| | | | TIME AFTER EXPIRY OF BENCH LIFE (min) | | | | | | | | SEALED FROM AIR | OPEN TO AIR |
| | | | 5 | 10 | 15 | 20 | 25 | 30 | 35 | 40 | | |
| BINDER 1 | 20 | 11.5 | 0.27 | 0.54 | 0.95 | 1.5 | 2.0 | 3.8 | 4.8 | 6.8 | 16.2 | 41.2 |
| BINDER 2 | 20 | 9.0 | 0.54 | 1.5 | 3.4 | 5.3 | 7.8 | 9.7 | 11.2 | 13.1 | 17.7 | 48.2 |

It is apparent from these results that binder (2) shows a much faster rate of strength development than binder (1). Thus to achieve a compression strength of 6.8 kg/cm² (i.e. 100 p.s.i.) binder (1) requires a time after expiry of the bench-life equivalent to a further 3.45 bench-lives. Binder (2) requires a time equivalent to only 2.55 bench-lives. In addition, binder (2) gives rise to significantly higher strengths after 24 hours, when equilibrium strengths have been attained, whether cores are stored in enclosed containers preventing dehydration or are stored exposed to the atmosphere.

EXAMPLE 4

Binder compositions (3) and (4) were compared using the procedure described in Example 3.

The results obtained are tabulated below:

| | | | COMPRESSION STRENGTH (kg/cm²) | | | | | | | | 24 HOURS | |
|---|---|---|---|---|---|---|---|---|---|---|---|---|
| | TEMP. (°C.) | BENCH LIFE (min) | TIME AFTER EXPIRY OF BENCH LIFE (min) | | | | | | | | SEALED FROM AIR | OPEN TO AIR |
| | | | 5 | 10 | 15 | 20 | 25 | 30 | 35 | 40 | | |
| BINDER 1 | 20 | 10.5 | 0.54 | 1.5 | 3.4 | 4.8 | 6.3 | 7.8 | 8.6 | 9.2 | 13.3 | 33.9 |
| BINDER 2 | 20 | 9.5 | 1.2 | 2.7 | 4.8 | 6.8 | 8.7 | 10.2 | 11.2 | 12.6 | 15.4 | 38.4 |

Thus binder (3) requires a time after expiry of the bench-life to achieve a strength of 6.8 kg/cm² (i.e. 100 p.s.i.) equivalent to a further 2.55 bench-lives. In the same respect, binder (4) requires only a further 2.10 bench lives. In addition, binder (4) gives noticeably higher strengths after 24 hours storage than binder (3).

EXAMPLE 5

The following binder compositions were prepared:
(5) 20 parts by weight of a starch hydrolysate solution having a dextrose equivalent of about 25 were mixed with 80 parts by weight of the sodium silicate solution used to prepare binder (1).
(6) 2 parts by weight of urea were dissolved in 100 parts by weight of binder (5).

Freshly prepared samples of binder compositions (5) and (6) were compared according to the procedure described in Example 1, and the following results were obtained.

| GASSING TIME (secs) | COMPRESSION STRENGTH (kg/cm²) | | | | | |
|---|---|---|---|---|---|---|
| | 5 | 10 | 20 | 30 | 60 | 120 |
| (5) As-gassed | 2.0 | 3.5 | 7.8 | 10.2 | 12.7 | 15.3 |
| Dry storage | 37.6 | 28.6 | 14.4 | 11.4 | 9.7 | 6.8 |
| Humid storage | 10.6 | 10.0 | 6.8 | 5.3 | 4.8 | 5.9 |
| (6) As-gassed | 2.2 | 4.7 | 9.4 | 11.8 | 14.5 | 13.1 |
| Dry storage | 48.2 | 33.5 | 15.5 | 11.7 | 7.4 | 6.8 |
| Humid storage | 13.1 | 10.6 | 8.3 | 7.4 | 5.9 | 5.3 |

Thus binder (6) offers certain advantages compared to binder (5). Binder (6) requires a gassing time of only 14 seconds to achieve an as-gassed strength of 6.8 kg/cm² (i.e. 100 p.s.i.), and results in strengths of 23.8 kg/cm² after dry storage and 9.3 kg/cm² on humid storage. Binder (5), however, requires 18 seconds to achieve the same as-gassed strength yet results in strengths of only 17.0 kg/cm² on dry storage and 7.3 kg/cm² on humid storage.

EXAMPLE 6

The following binder composition was prepared:

(7) 1 part by weight of mixed isomers of di- and trihydroxy diphenyls (a still residue from the distillation of crude resorcinol) was dissolved in 100 parts by weight of binder (2).

Binders (1), (2) and (7) were compared according to the procedure described in Example 1. Compression strengths were measured on cores immediately after gassing, and the following results were obtained:

| GASSING TIME (secs) | COMPRESSION STRENGTH (kg/cm²) | | | | | |
|---|---|---|---|---|---|---|
| | 5 | 10 | 20 | 30 | 60 | 120 |
| (1) | 2.0 | 3.7 | 6.1 | 8.2 | 11.3 | 12.2 |
| (2) | 2.5 | 4.6 | 7.1 | 9.0 | 12.9 | 12.7 |
| (7) | 2.9 | 5.9 | 8.5 | 10.7 | 13.5 | 15.0 |

It is apparent that the improvement in the rate of strength development offered by binder (2) compared to binder (1) may be further improved by addition of the phenolic compound described. Thus to achieve an as-gassed strength of 6.8 kg/cm² (i.e. 100 p.s.i.) requires a gassing time of about 23 seconds for binder (1) whereas binder (2) requires 19 seconds and binder (7) only 13 seconds. Furthermore, binder (7) offers a higher maximum as-gassed strength than does binder (1).

I claim:

1. In a binder composition obtained by mixing, in aqueous solution, an alkali metal silicate and a hydrogenated starch hydrolysate, the improvement comprising including urea in said composition.

2. A binder composition according to claim 1 characterised in that it contains 15–47% by weight of alkali metal silicate, 2–45% by weight of the starch hydrolysate, 0.1–10% by weight of urea and balance water.

3. A binder composition according to claim 1 characterised in that it contains 26–45% by weight of alkali metal silicate, 3–27% by weight of the starch hydrolysate, 0.4–4% by weight of urea and balance water.

4. A binder composition according to any one of claims 1 to 3 characterised in that it also contains furfuryl alcohol.

5. A binder composition according to any one of claims 1 to 3 characterised in that it also contains formaldehyde.

6. A binder composition according to any one of claims 1 to 3 characterised in that the alkali metal silicate is sodium silicate.

7. In a method of making an article of bonded particulate material which comprises forming to the desired shape a mixture comprising particulate material and a binder, and causing or allowing the mixture to harden; the improvement comprising, as the binder, the composition according to any one of claims 1 to 3.

8. In a binder composition obtained by mixing, in aqueous solution, an alkali metal silicate, a substantially water soluble carbohydrate selected from monosaccharides, disaccharides, polysaccharides and derivatives thereof and an oxyanion salt, the improvement comprising including urea in said composition.

9. A binder composition according to claim 8 characterised in that it contains 15–47% by weight of alkali metal silicate, 2–45% by weight of carbohydrate, 0.5–5% by weight oxyanion salt, 0.1–10% by weight of urea and balance water.

10. A binder composition according to claim 8 characterised in that it contains 26–45% by weight of alkali metal silicate, 3–27% by weight of carbohydrate, 0.5–2% by weight oxyanion salt, 0.4–4% by weight of urea and balance water.

11. A binder composition according to any one of claims 8 to 10 characterised in that it also contains furfuryl alcohol.

12. A binder composition according to any one of claims 8 to 10 characterised in that it also contains formaldehyde.

13. A binder composition according to any one of claims 8 to 10 characterised in that the alkali metal silicate is sodium silicate.

14. A binder composition according to any one of claims 8 to 10 characterised in that the oxyanion salt is an alkali metal borate.

15. A binder composition according to any one of claims 8 to 10 characterised in that the carbohydrate is a monosaccharide selected from glucose and fructose.

16. A binder composition according to any one of claims 8 to 10 characterised in that the carbohydrate is a disaccharide selected from sucrose, maltose and lactose.

17. A binder composition according to any one of claims 8 to 10 characterised in that the carbohydrate is a hydrogenated starch hydrolysate.

18. In a method of making an article of bonded particulate material which comprises forming to the desired shape a mixture comprising particulate material and a binder, and causing or allowing the mixture to harden; the improvement comprising, as the binder, the composition according to any one of claims 8 to 10.

* * * * *